US012072031B2

(12) United States Patent
Kalyanasundaram et al.

(10) Patent No.: US 12,072,031 B2
(45) Date of Patent: Aug. 27, 2024

(54) SYSTEMS AND METHODS FOR REDUCING SIMMER IN A SAFETY RELIEF VALVE

(71) Applicant: Emerson Automation Solutions Final Control US LP, Houston, TX (US)

(72) Inventors: Vishwa Kalyanasundaram, Stafford, TX (US); Narendra Arun Kulkarni, Pune (IN)

(73) Assignee: Emerson Automation Solutions Final Control US LP, Houston, TX (US)

( * ) Notice: Subject to any disclaimer, the term of this patent is extended or adjusted under 35 U.S.C. 154(b) by 0 days.

(21) Appl. No.: 17/947,438

(22) Filed: Sep. 19, 2022

(65) Prior Publication Data

US 2023/0088255 A1   Mar. 23, 2023

Related U.S. Application Data

(60) Provisional application No. 63/245,452, filed on Sep. 17, 2021.

(51) Int. Cl.
  *F16K 17/04*  (2006.01)
  *F16K 15/06*  (2006.01)
(52) U.S. Cl.
  CPC ............ *F16K 17/04* (2013.01); *F16K 15/063* (2013.01); *Y10T 137/7722* (2015.04)
(58) Field of Classification Search
  CPC ......... Y10T 137/7722; Y10T 137/7747; F16K 17/04; F16K 15/063; F16K 25/00; F16K 17/0466
  See application file for complete search history.

(56) References Cited

U.S. PATENT DOCUMENTS

| 150,536 | A | * | 5/1874 | Crosby | ............... F16K 17/0433 |
| | | | | | 137/543 |
| 1,231,330 | A | * | 6/1917 | Clark | ....................... F16K 17/08 |
| | | | | | 137/478 |
| 1,696,452 | A | * | 12/1928 | Fairfield | .................. F16K 17/10 |
| | | | | | 137/476 |
| 2,134,803 | A | * | 11/1938 | Rose | ....................... F16K 17/065 |
| | | | | | 137/469 |
| 2,597,057 | A | * | 5/1952 | Bergquist | ............. F16K 17/0433 |
| | | | | | 137/470 |

(Continued)

FOREIGN PATENT DOCUMENTS

| CH | | 481333 A | * | 11/1969 |
| DE | | 3738071 A1 | * | 5/1988 |

(Continued)

OTHER PUBLICATIONS

English Translation of KR101147815B1 retrieved from espacenet.com May 2023 (Year: 2023).*

(Continued)

*Primary Examiner* — Jessica Cahill
(74) *Attorney, Agent, or Firm* — Quarles & Brady LLP

(57) ABSTRACT

A spring-operated relief valve can include a biasing assembly, a valve inlet, a valve seat, and a disc assembly that is biased toward the valve seat by the biasing assembly. A fluid guide, such as a groove or chamber, can be formed at the interface between the valve seat and the disc assembly. The fluid guide can be configured to direct fluid that flows across the valve seat to provide an upward force on the disc assembly during a relief event.

20 Claims, 14 Drawing Sheets

(56) References Cited

U.S. PATENT DOCUMENTS

| | | | | |
|---|---|---|---|---|
| 4,130,130 A | * | 12/1978 | Stewart | F16K 17/0433 137/478 |
| 4,858,642 A | | 8/1989 | Fain, Jr. | |
| 2002/0189680 A1 | * | 12/2002 | Choate | F16K 17/04 137/469 |
| 2011/0284092 A1 | * | 11/2011 | Spencer | F16K 25/00 137/528 |

FOREIGN PATENT DOCUMENTS

| | | | | |
|---|---|---|---|---|
| DE | 3813942 A1 | * | 11/1989 | |
| KR | 20120024243 A | * | 3/2012 | |
| KR | 101147815 B1 | * | 5/2012 | |

OTHER PUBLICATIONS

Emerson, Crosby J-Series Direct Spring Pressure Relief Valves, product booklet, 92 pages, 2017.

\* cited by examiner

| GROOVE DESIGN | MEDIUM | SEAT WIDTH CONSIDERATION | FLOWING PRESSURE (PSIG) | | | | | |
|---|---|---|---|---|---|---|---|---|
| | | | 25 | 33 | 40 | 65 | 80 | 100 |
| GROOVE 1 VS STANDARD | GAS | REDUCED (ACTUAL) | 10% | 5% | 7% | 8% | 5% | 5% |
| | LIQUID | REDUCED (ACTUAL) | 16% | 10% | NA | NA | NA | 8% |
| | GAS | UNCHANGED | 5% | 1% | 3% | 4% | 1% | 1% |
| | LIQUID | UNCHANGED | 11% | 5% | NA | NA | NA | 4% |
| GROOVE 2 VS STANDARD | GAS | REDUCED (ACTUAL) | 10% | 6% | 5% | 5% | 6% | 5% |
| | LIQUID | REDUCED (ACTUAL) | 13% | 10% | NA | NA | NA | 10% |
| | GAS | UNCHANGED | 6% | 2% | 1% | 1% | 2% | 0% |
| | LIQUID | UNCHANGED | 9% | 6% | NA | NA | NA | 5% |

FIG. 10

| GROOVE DESIGN | MEDIUM | SEAT WIDTH CONSIDERATION | SET PRESSURE (PSIG) | | |
|---|---|---|---|---|---|
| | | | 25 | 40 | 100 |
| GROOVE 1 VS STANDARD | GAS | REDUCED (ACTUAL) | -10% | -4% | 0% |
| | LIQUID | REDUCED (ACTUAL) | -13% | -4% | -5% |
| | GAS | UNCHANGED | -9% | -3% | 0% |
| | LIQUID | UNCHANGED | -11% | -2% | -3% |

FIG. 11

SYSTEMS AND METHODS FOR REDUCING SIMMER IN A SAFETY RELIEF VALVE

CROSS-REFERENCE TO RELATED APPLICATIONS

This application claims priority to U.S. provisional patent application No. 63/245,452, titled "Systems and Methods for Reducing Simmer in a Safety Relief Valve" and filed on Sep. 17, 2021, the entirety of which is incorporated herein by reference.

BACKGROUND

Safety relief valves, such as spring-operated pressure relief valves, for example, are used extensively in systems and vessels where pressure protection is required. For example, in some systems, excess pressure can lead to a process upset, instrument failure, or other equipment failure. Pressure relief valves can allow excess pressure to be relieved by allowing pressurized fluid to flow from an auxiliary passage out of the system.

SUMMARY

Examples of the disclosed technology can provide improved arrangements for responsive movement of pressure relief valves, including during operation near set pressures of the valves. For example, some disclosed features to direct flow can be provided on a disc assembly, a disc holder, a disc insert, a nozzle, a nozzle extender, or combinations thereof to provide improved performance relative to valve simmer. In some examples, recesses can be formed by grooves, angled ends, or other features to improve flow huddling during relief events and thereby increase the forces from the fluid that urge the relevant valve to open, as compared to conventional designs without such features. These and other disclosed arrangements can thus improve valve performance during relief events, particularly at low values of valve lift, and including by reducing valve simmering (e.g., relative to duration or total released fluid).

Some examples provide a spring-operated relief valve that can include a main spring or other biasing assembly, a valve inlet, a valve seat, and a disc assembly that is biased toward the valve seat by the biasing assembly. The disc assembly can be movable axially to and from a closed orientation in which the seat region provides a seal with the valve seat against flow through the spring-operated relief valve. The seat region can include a groove positioned at an interface between the valve seat and the disc assembly with the disc assembly in a closed configuration. The groove can be exposed to a flow of process fluid past the valve seat with the disc assembly in an open configuration.

In some examples, a spring-operated relief valve can include a disc assembly with a disc insert that defines a sealing surface with an inner diameter and an outer diameter. A groove can be formed in the disc insert between the inner diameter and the outer diameter.

In some examples, a spring-operated relief valve can include a groove configured as an annular corrugation that is integrally formed in a disc assembly.

In some examples, a spring-operated relief valve can include a groove that includes an apex formed by side walls of the groove that extend at about a 45 degree angle with respect to a radial direction (e.g., perpendicularly to an axial opening-and-closing direction for a valve).

In some examples, a spring-operated relief valve can include a groove that includes an apex formed by at least one side wall of the groove. The at least one side wall can extend at about a 30 degree angle with respect to a radial direction.

In some examples, a spring-operated relief valve can include a groove that includes a trapezoidal geometry.

In some examples, a spring-operated relief valve can include a plurality of grooves formed on a disc assembly. The plurality of grooves can be exposed to a process fluid when the disc assembly is in an open configuration (e.g., to provide axially-opening chambers for increased flow huddling).

In some examples, a spring-operated relief valve can include a groove that is configured to one or more of: define a chamber configured to provide a valve-opening (e.g., axial) force augmentation to reduce valve simmering during a relief event; or divert fluid momentum to provide an increased valve-opening (e.g., axial) force on the disc assembly during a valve relief event.

In some examples, a spring-operated relief valve can include a fluid guide to divert a portion of fluid flow during a relief event of the spring-operated pressure relief valve. Such a diversion of fluid flow from a main flow path through the valve (e.g., from a nozzle seat along an outer diameter of the nozzle) can convert a portion of fluid momentum into a valve-opening (e.g., axial) force. In opposition to a biasing assembly of the relief valve, for example, this conversion of momentum can reduce valve simmer in the relief valve (e.g., can reduce the duration of, or total released fluid from, valve simmer for a given pressure trace at an inlet of a valve with the fluid guide, as compared to without the fluid guide).

In some examples, the fluid guide can include one or more of: a nozzle lip proximate the valve seat, a recess formed in a disc holder of the disc assembly proximate the valve seat, or a nozzle extension. The nozzle lip can define an angle of about 15 degrees with respect to a radial plane. The recess can be arranged to receive a diverted fluid flow from between the disc assembly and the nozzle. The nozzle extension can include an axial end that one or more of: angles in an upstream direction at about 15 degrees with respect to a radial plane; or defines an initial flow gap between the nozzle extension and a shroud of the disc assembly.

Some examples of the disclosed technology provide a disc assembly for a relief valve. The disc assembly can include a disc insert that includes a body, a seat region, and a chamber. The body can be configured to move in an axial direction to seal a relief valve (e.g., to move axially under or against an axial force from a biasing assembly as, respectively, the valve closes or opens). The seat region can be included on the body and can be configured to seal against a valve seat of a relief valve to seal the relief valve. The seat region can define a seat-region width that extends between an inner diameter and an outer diameter defined by the body. The chamber can be formed in the body within the seat region, between the inner diameter and the outer diameter. The chamber can define a chamber width and can be exposed (e.g., open in the axial direction) to receive a diverted flow of process fluid when the disc assembly is in an open configuration.

In some examples, a disc assembly can include a chamber within a seat region of the disc assembly, with a chamber width that is less than a width of the seat region.

In some examples, a disc assembly can include a chamber that is defined by a continuous annular groove.

In some examples, a disc assembly can include a chamber that defines an apex between the inner diameter and the outer diameter. The apex can define an apex angle between 30 degrees and 90 degrees, inclusive.

In some examples, a disc assembly can include a chamber that defines an apex that is positioned closer to an outer diameter than to an inner diameter of a sealing region of a disc body (e.g., of a disc insert).

In some examples, a disc assembly can include a chamber defined by a trapezoidal groove. The trapezoidal groove can be positioned closer to an outer diameter than to an inner diameter of a disc body (e.g., of a disc insert).

In some examples, a disc assembly can include a disc holder configured to interchangeably receive the disc insert.

In some examples, a disc assembly can include a chamber. A depth of the chamber can extend (e.g., axially) into a body of a disc insert. The depth of the chamber can be less than a chamber width (e.g., radially).

Some examples of the disclosed technology provide a simmer reduction system for a spring-operated pressure relief valve. The simmer reduction system can include a nozzle, a disc assembly, and a fluid guide on one or more of the nozzle or the disc assembly. The disc assembly can be adapted to move in an axial direction to seal against the nozzle. The fluid guide can be adapted to divert a portion of fluid flow past the nozzle during a relief event of the spring-operated pressure relief valve away from the nozzle to convert a portion of the fluid momentum of the fluid flow into an axial force to move the disc assembly away from the nozzle.

In some examples, a fluid guide can be an axially-opening recess formed in a disc holder of a disc assembly. The recess can be adapted to divert fluid flowing between the disc assembly and a nozzle to provide a lifting force on the disc assembly. In some examples, an angled lip of the nozzle can be located within the axially-opening recess with the disc assembly in a closed position. The angled lip can extend at about 5 degrees relative to a radial plane.

In some examples, a fluid guide can be formed on a nozzle. The fluid guide can be configured to divert fluid flowing between a disc assembly and the nozzle to provide a lifting force on the disc assembly.

In some examples, a disc assembly can include a shroud having a distal end that surround a nozzle adjacent to a seat region that is defined by the nozzle and a disc assembly.

In some examples, a simmer reduction system can include a nozzle extension. An initial flow gap can be defined between the nozzle extension and a distal end of a disc assembly. A non-zero size of the initial flow gap can provide improved lifting force on the disc assembly as compared to other arrangements.

In some examples, a surface of a nozzle extension facing toward a seat region of a valve can angle away from an outer diameter of a nozzle to redirect flow from the nozzle toward a disc assembly. The surface can form a non-zero angle with a radial reference plane (e.g., about a 15 degree angle, or an angle of 15 degrees or less). In some examples, the surface can extend to define an initial flow gap with the disc assembly.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology:

FIG. 10 is a table presenting percent increases of a force ratio for a spring-operated pressure relief valve that includes the disc holder of FIG. 4 for gaseous nitrogen and liquid water at various flowing pressures.

FIG. 11 is a table presenting a combined performance increase in blowdown and overpressure of a spring-operated pressure relief valve that includes the disc holder of FIG. 4 for gaseous nitrogen and liquid water at various set pressures.

DETAILED DESCRIPTION

Figure 1:
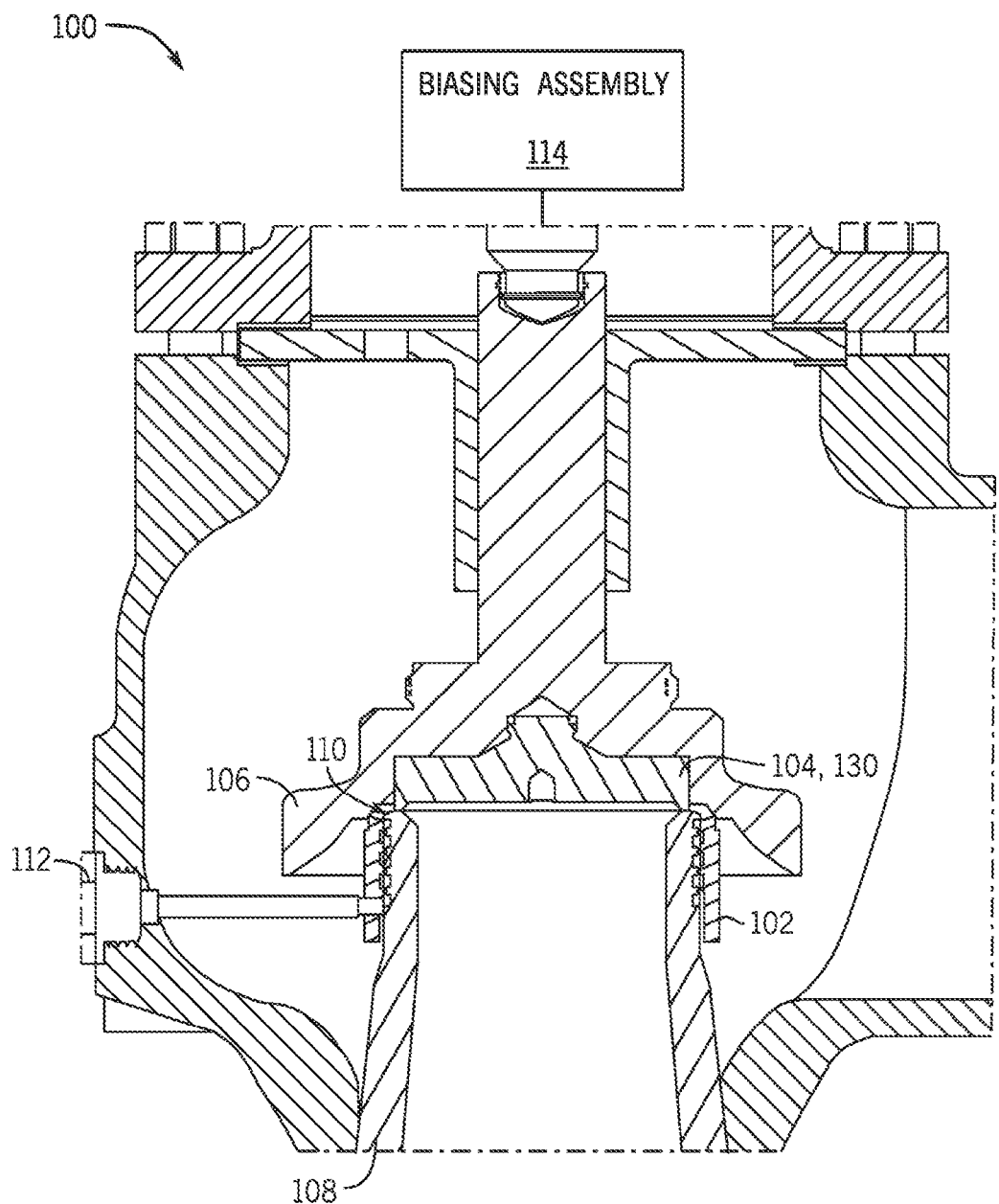
FIG. 1 is a cross-sectional partial view of a spring-operated pressure relief valve including a nozzle ring, with the valve in a closed orientation.

The following discussion is presented to enable a person skilled in the art to make and use examples of the disclosed technology. Various modifications to the illustrated examples will be readily apparent to those skilled in the art, and the generic principles herein can be applied to other examples and applications without departing from examples of the disclosed technology. Thus, examples of the disclosed technology are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of examples of the disclosed technology. Skilled artisans will recognize the examples provided herein have many useful alternatives and fall within the scope of examples of the disclosed technology.

Before any examples of the disclosed technology are explained in detail, it is to be understood that the disclosed technology is not limited in its application to the details of construction and the arrangement of components set forth in the following description or illustrated in the attached drawings. The disclosed technology is capable of other examples and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

As briefly discussed above, certain systems and vessels require pressure protection to avoid over-pressurization. Spring-operated pressure relief valves can be used in such systems to relieve and divert excess fluid pressure. In general, spring-operated pressure relief valves include a spring that is compressed by a predetermined value. The spring provides a force on a valve disc in a valve-closing direction (e.g., downward), thereby biasing the valve toward a closed position. The compression of the spring can be adjusted via a spring adjustment mechanism, such as an adjustable screw that controls the degree of compression of the spring for a given valve lift. When an opening (e.g., upward) force exerted by a pressurized fluid acting on the valve disc equals the closing (e.g., downward) force of the spring, plus any ancillary forces (e.g., due to the weight of a disc assembly), the valve begins to open. As the fluid pressure continues to increase, the spring is further compressed, and the valve is further opened.

Spring-operated pressure relief valves are generally configured to provide a set pressure, which is typically predetermined and preset before installation of the valves. The set pressure is typically a pressure at which the valve opens and there is a significant relief of system pressure, although other definitions are applied in different installations, as is known in the industry. In some instances, the set pressure may be defined as the pressure at which a first audible response (i.e., "pop") can be heard by a user, as a spring-operated pressure relief valve releases system pressure, or may be defined as the pressure at which leakage through a valve is first audible for human operators. As appropriate, the set pressure for a particular valve can be adjusted by varying the compression of a spring within the valve, including by adjusting a pressure adjustment screw to compress or release a spring by a certain amount.

In addition to a set pressure, spring-operated pressure relief valves further define a crack pressure. The crack pressure is a pressure at which the disc assembly of the valve first begins to lift from the valve seat in response to system pressure. In other words, the crack pressure may be defined as a pressure at which the force of the fluid on a line side of the valve seat equals the force exerted by the spring (and any ancillary forces) on a relief side of the valve seat. The effect of a system reaching crack pressure can be minute fluid leakage or a low decibel audible noise (e.g., such as may not necessarily be audible to human operators). A valve simmer can be defined when there is an audible or visible escape of fluid between the disc and the seat that occurs when the valve opens slightly.

In some cases, when a spring-operated pressure relief valve is at crack pressure, the valve disc may lift from the valve seat. In some systems, the set pressure value can be a small percentage (e.g., 3-5%) larger than a crack pressure value, such that a set pressure can be defined relative to a crack pressure (or vice versa), although other approaches are possible. In general, valve lift can be defined as a distance between seating surfaces of a disc assembly and a nozzle in a spring-operated pressure relief valve, as the valve transitions between a closed and open position. The lift is said to be zero when the valve is in a closed position, and the lift reaches a maximum when the valve is in a fully opened position. In some examples, valve lift distance can be defined relative to a disc insert of a disc assembly, and some examples below are presented in this context. However, discussion of features on or adjacent to disc inserts is not intended to limit the disclosure of relevant features only to disc inserts or to inserts of the general type illustrated.

Spring-operated pressure relief valves can further define a blowdown pressure. The blowdown pressure corresponds to a pressure below the set pressure where the valve recloses after opening. In some industries, a standard (e.g., required) blowdown pressure for a spring-operated pressure relief valve is greater than 3% below the set pressure. Relatedly, an overpressure for a spring-operated pressure relief valve can be defined as the required increase in pressure above the set pressure to achieve the relieving capacity of the valve (e.g., to move the valve to full lift). In some industries, a standard overpressure is less than 10% above the set pressure. However, different standards and/or requirements for overpressure and the blowdown pressure are possible.

As briefly discussed above, a spring-operated pressure relief valve can experience simmering when a small amount of fluid escapes between the disc and the seat when the valve is opened slightly, just after the crack pressure and before the set pressure (e.g., a popping pressure). In general, a long simmer may be undesirable because it can increase the time between the crack pressure and the popping pressure which may require the valve to have an overpressure that is greater than 10% of the set pressure to achieve a rated capacity. In some instances, decreasing the overpressure can correspondingly increase the blowdown time which corresponds to an increase of product loss. In general, simmering can occur when the fluid pressure is above the crack pressure and below the set pressure. Often, a simmering effect is more pronounced in valves with low set pressures that operate with compressible media, and valves at low to mid set pressure that operate with incompressible media.

Some conventional spring-operated pressure relief valves can include a mechanism to reduce simmer in the valve and urge the set pressure closer to the crack pressure of the valve. For example, a spring-operated pressure relief valve can include a nozzle ring. In general, the nozzle ring can provide lift assist at the valve seat. The nozzle ring is configured to reduce valve simmering by restricting the flow during initial valve opening movement by acting as an additional orifice. In use, the fluid flows across the nozzle ring and is correspondingly stagnated (e.g., huddled) near the outer diameter of the disc insert. The huddling effect of the nozzle ring decreases when it is moved away (e.g., lowered away) from the disc holder and increases when the nozzle ring is moved (e.g., raised) closer to the disc holder. The relative position of the nozzle ring and the disc holder can also significantly affect the blowdown (e.g., a raised nozzle ring can correspond to a longer blowdown).

In use, positioning the nozzle ring to optimize blowdown can require precise control (e.g., on the scale of 0.001 inches). Such control can be achieved via a fine thread with a large number of slots on the rim of the nozzle to control the adjustment, but may be difficult to consistently implement. Further, while a nozzle ring can improve unwanted simmering in a spring-operated pressure relief valve, it can also provide undesirable added material costs and have cumbersome adjustment requirements, among other drawbacks.

Examples of the disclosed technology can improve on reducing simmer in a spring-operated pressure relief valve, including without requiring the use of a nozzle ring. For example, a disc insert of a spring-operated pressure relief valve can include corrugation (e.g., one or more grooves) near a seat region of the disc insert. In use, the corrugation can divert a portion of fluid flow in the valve into one or more small chambers or other fluid guides created by the corrugation. As a result, in some cases, the momentum of the diverted fluid or related pressure huddling effects can then provide a supplemental upward force to lift the valve. The supplemental upward force can provide a required force augmentation necessary to reduce simmer so that once the disc insert has left the seat, steady or increased fluid pressure (e.g., at or near crack pressure) will continue to raise the disc insert rather than allow repeated up and down movement (i.e., simmering).

In general, a disc insert that includes one or more grooves or other corrugation can reduce valve simmering in a relief valve while not restricting flow as may result from adding another orifice, unlike a conventional nozzle ring as described above. Additionally, the simmering reduction mechanism (i.e., the one or more grooves) can be integrally formed with the moving component of the valve (i.e., can be formed as part of the moving component rather than formed separately and then attached thereto). As a result, the huddling effect of the grooved disc insert may not strongly depend on the distance of the valve from the valve seat, as can be the case for conventional nozzle rings. In other words, the force augmentation relative to disc assemblies without corrugation can be sustained throughout the valve lift without any loss of pressure as the lift increases. Additionally, unlike the nozzle ring, valves with one or more grooves within a disc insert may not require precise adjustment or an added mechanism to retain location or orientation, as may be the case for valves with nozzle rings. As a result, a disc insert having one or more grooves (or other corrugation) can reduce manufacturing and installation cost, and maintenance requirements throughout the life of the valve.

Referring now to FIG. 1, a conventional spring-operated pressure relief valve 100 is shown, including a nozzle ring 102. The valve 100 includes a disc insert 104 secured to a disc holder 106. The nozzle ring 102 is secured relative to a nozzle 108 proximate to a seat 110 of the valve 100. The seat 110 is oriented at the end of an entrance region for the valve 100 (i.e., as defined by the nozzle 108 in the example shown), and is thus arranged to provide a seal at an interface between the nozzle 108 and the disc inset 104 with the valve 100 in the closed orientation (i.e., as shown in FIG. 1).

As briefly described above, a nozzle ring can reduce simmer in a valve by providing another orifice that flow is restricted through, as the flow comes across the nozzle seat and by stagnating (e.g., huddling) the pressure in a larger area. In general, the huddling effect of the nozzle ring decreases when the nozzle ring is moved away from the disc holder (e.g., lowered as shown) and increases when the nozzle ring is moved closer to the disc holder (e.g., raised, as shown). As a result, the distance from the nozzle ring 102 to the disc holder 106 can require precise control to achieve a desired blowdown. As illustrated in FIG. 1, the spring-operated pressure relief valve 100 also includes a set screw 112 configured to secure the nozzle ring 102 relative to the nozzle 108. A biasing assembly 114 can be arranged to bias the disc assembly (i.e., the disc holder 106 and the disc insert 104, as shown) toward the nozzle 108. For example, in conventional arrangements a main spring can be seated between upper and lower spring carriers. In such an arrangement, a set pressure of the valve can generally be adjusted via adjustment of the relative spacing of the spring carriers (e.g., via axial movement of the upper spring carrier, relative to a bonnet, using a threaded adjustment mechanism).

As briefly discussed above, general drawbacks to a nozzle ring can include, among others, inconsistent huddling effects based on the distance of the nozzle ring from a disc holder. Additionally, a raised nozzle ring can produce a longer blowdown and therefore, more product loss. Because the nozzle ring requires precise control, a spring-operated pressure relief valve having a nozzle ring can also be subject to higher manufacturing, installation, and maintenance costs. In some conventional valves that do not employ a mechanism to reduce simmering (e.g., a nozzle ring), simmering can be unstable at low mass flow rates through the valve. For example, FIGS. 2 and 3 illustrate pressure ratio curves for various valve height lifts for gas and liquid, respectively.

Figure 2:
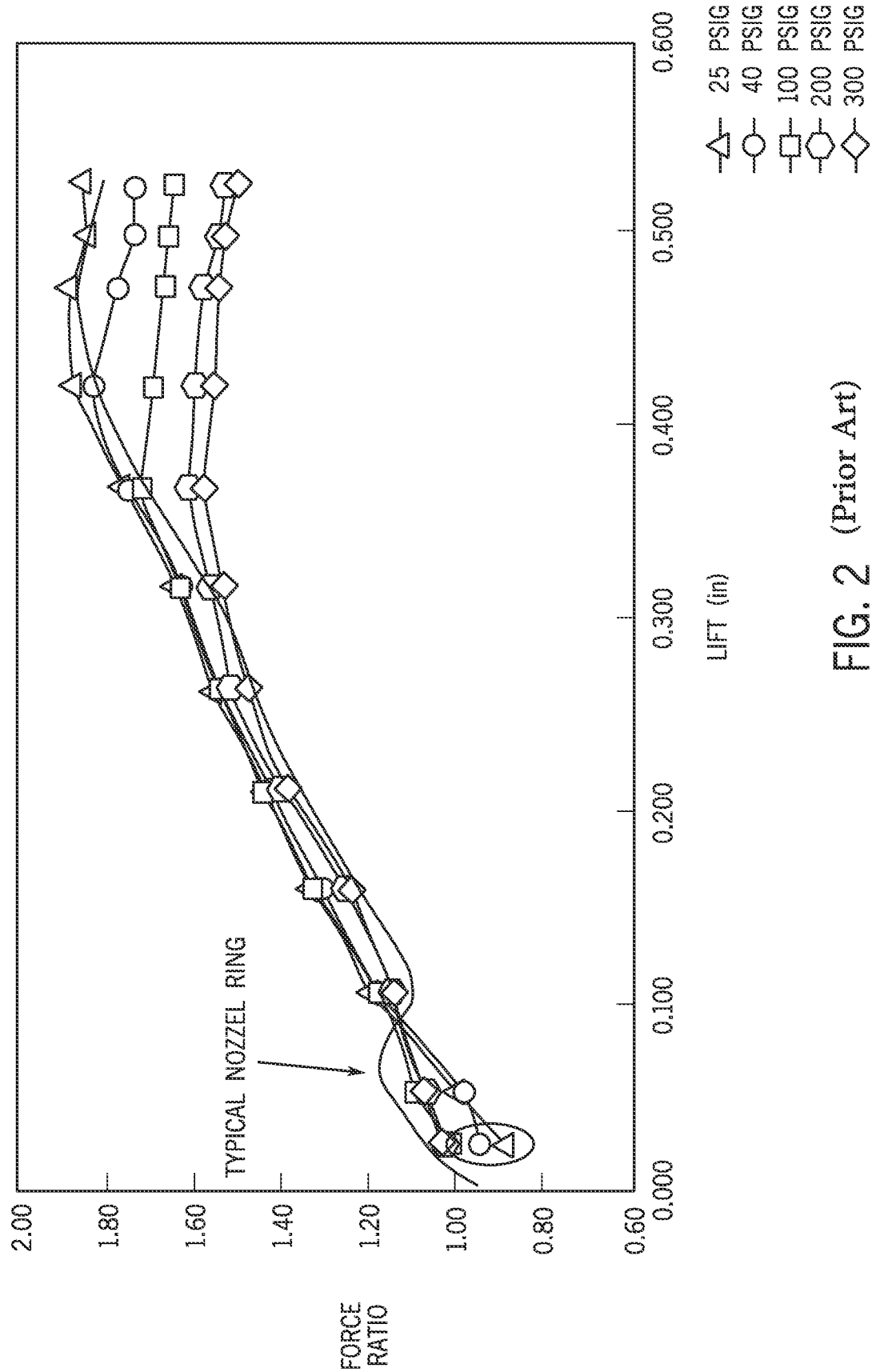
FIG. 2 is a graph illustrating a force ratio versus lift of a conventional spring-operated pressure relief valve for gaseous nitrogen at various flowing pressures.

With reference to FIG. 2, the graph shows force ratio versus lift height of a conventional spring-operated pressure relief valve without a nozzle ring and a spring-operated pressure relief valve having a nozzle ring for gaseous nitrogen ($N_2$) at various flowing pressures. The force ratio is the measured force of the system fluid normalized by (i.e., divided by) the force at zero valve lift. In general, the force ratio is an indication of how effectively (and efficiently) the valve may be lifted depending on the height of the valve. At 0 lift, the force ratio is 1 because the measured force is equal to the force at zero lift. However, some conventional valves can exhibit a drop in force ratio at small lifts. In this regard, for example, the circled data points on the graph indicate a drop in the force ratio below 1 at lower lifts (e.g., 0.03 inches), which is observed for flowing pressures at 25 psig and 40 psig. In other words, without a nozzle ring, some flowing pressures temporarily decrease the valve's ability to lift as the lift height increases, which can complicate blowdown and overpressure calibrations and lead to extended simmering. As shown by the indicated line, use of a nozzle ring can help to avoid this effect at low lifts, but can still lead to suboptimal overall performance and valve instabilities.

Figure 3:
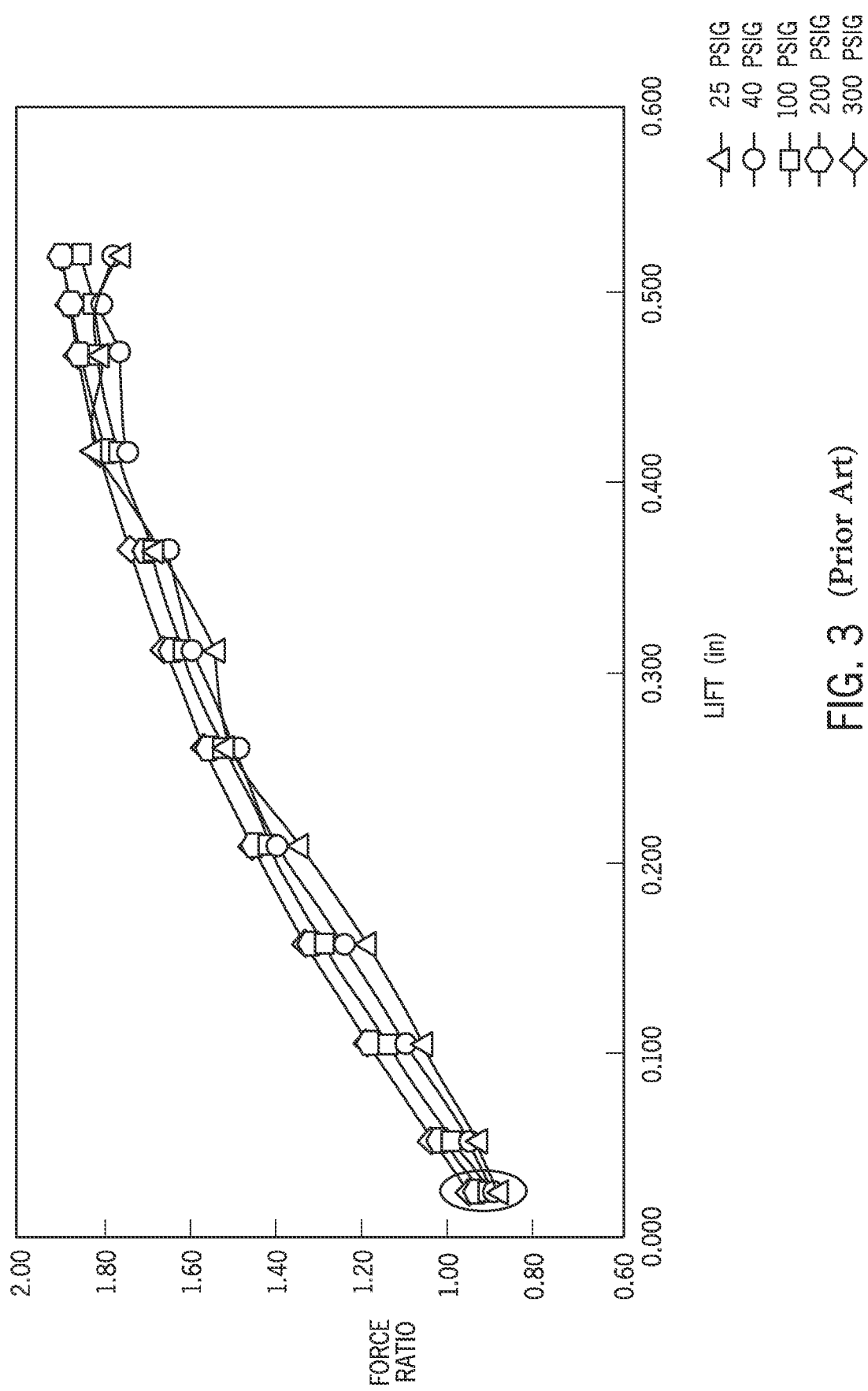
FIG. 3 is a graph illustrating a force ratio versus lift of a conventional spring-operated pressure relief valve for liquid water at various flowing pressures.

Similarly, the graph of FIG. 3 shows force ratio versus lift height of a conventional spring-operated pressure relief valve without a nozzle ring for liquid water ($H_2O$) at various flowing pressures. The circled data points on the graph indicate a drop in the force ratio below 1 at lower lifts (e.g., 0.03 inches), which is observed for all flowing pressures represented in the graph. Similar to the curves illustrated in FIG. 2, the flowing pressures represented in the graph can temporarily decrease the valve's ability to lift as the lift height increases between 0 inches and 0.03 inches. It should be appreciated that the force ratio curves of FIGS. 2 and 3 are by way of example, and that similar trends can be observed under a variety of conditions with various fluid media.

Examples of the disclosed technology, including systems and methods to reduce simmering in a relief valve, including relative to the operational characteristics shown in FIGS. 2 and 3, and will be further discussed below, including with reference to FIGS. 4-10. Additionally, examples of the disclosed technology can address drawbacks of conventional spring-operated pressure relief valves having nozzle rings to reduce simmering events. Generally, as also noted above, some examples can include one or more grooves (e.g., in a corrugated geometry) on a surface of a disc assembly that is exposed to pressure of a process fluid as the relief valve opens. For example, one or more annular or other grooves can be formed on a sealing surface of a disc insert (or other body) that is configured to seal against a valve seat with the relevant valve in a closed orientation.

Figure 4:
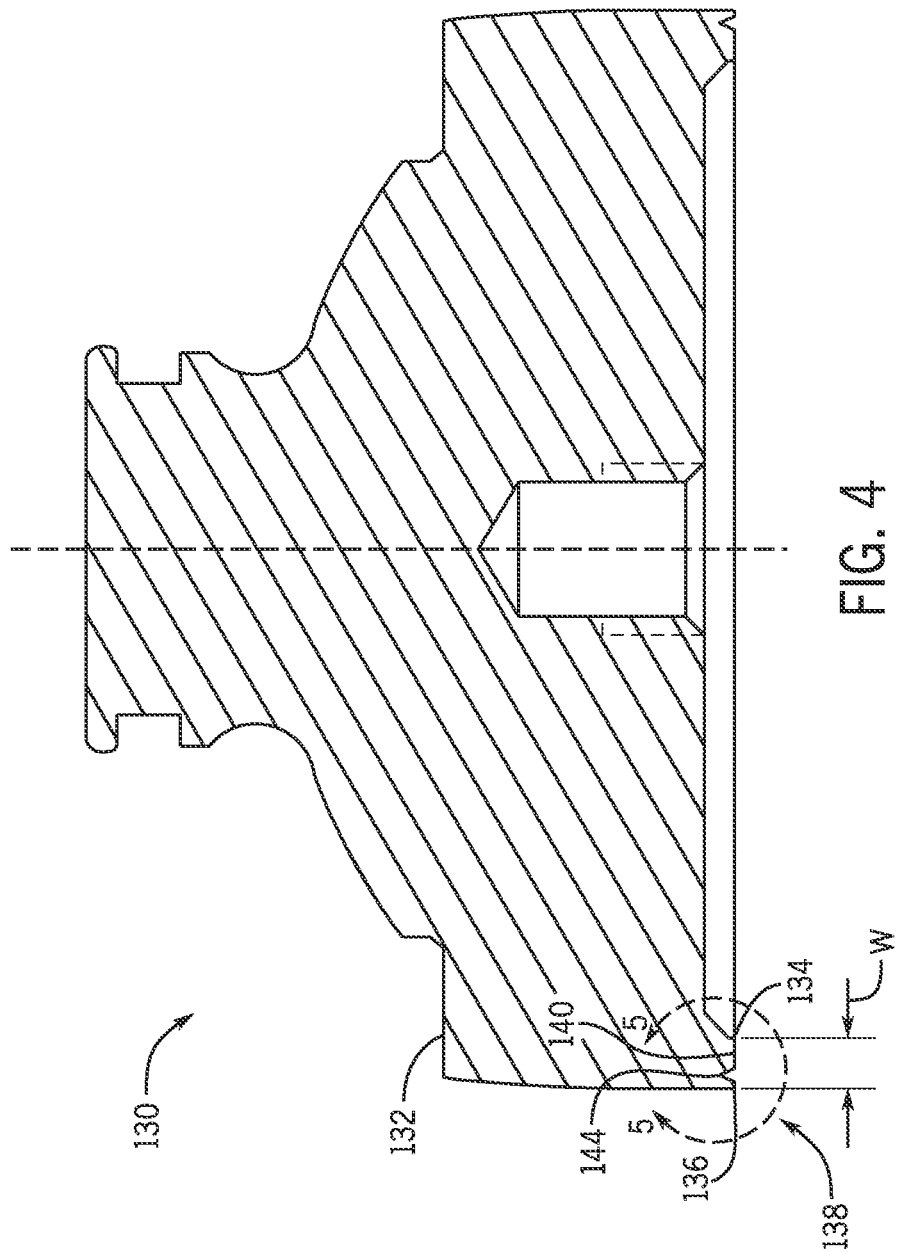
FIG. 4 is a cross-sectional view of a disc holder according to an example of the disclosed technology.

With reference to FIG. 4, for example, a disc insert 130 for a spring-operated pressure relief valve according to one example of the disclosed technology is shown. The disc insert 130 can be used in a variety of relief valves and disc assemblies, including the relief valve 100 illustrated in FIG. 1 (e.g., as an alternate configuration for the disc insert 104). The disc insert 130 is configured to reduce simmering in a spring-operated relief valve as compared to conventional designs and therefore can sometimes be used in a spring-operated pressure relief valve without a nozzle ring, e.g., the nozzle ring 102.

The disc insert 130 includes a body 132 that defines an inner diameter 134 and an outer diameter 136 for potential engagement with a seat of a relevant valve to seal against fluid flow. Correspondingly, the inner diameter 134 and the outer diameter 136 define inner and outer boundaries of a seat region 138 of the disc insert 130 in the example shown. The seat region 138 defines a (radial) width W between the inner diameter 134 and the outer diameter 136. The seat region can be configured to seal, in whole or in part, against a seat of a relevant valve at an interface between the disc insert 130 and the seat (e.g., as generally shown in FIG. 1 for the insert 104 and the seat 110). In particular, as shown schematically for the illustrated example, in FIG. 4, the seat region 138 can include an annular sealing surface 140 that is located on an axial end of the body 132 so as to contact a valve seat (e.g., the seat 110) when the relevant valve is closed. Other configurations may be possible in other examples.

As shown schematically in FIG. 4, the sealing surface 140 of the disc insert 130 includes a groove 144 formed in the body 132 at the seat region 138. In some examples, the schematically represented groove 144 can be one of a plurality of grooves that extend fully or partially around the circumference of the disc insert 130 at the seat region 138 (e.g., multiple full-circumference annular corrugations). In some examples, the schematically represented groove 144 can exhibit a different shape than is illustrated, including with square, rounded, trapezoidal, or other cross-sections. As more fully discussed below, a groove (or grooves) thus located can provide improved valve performance relative to relief events.

Figure 5:
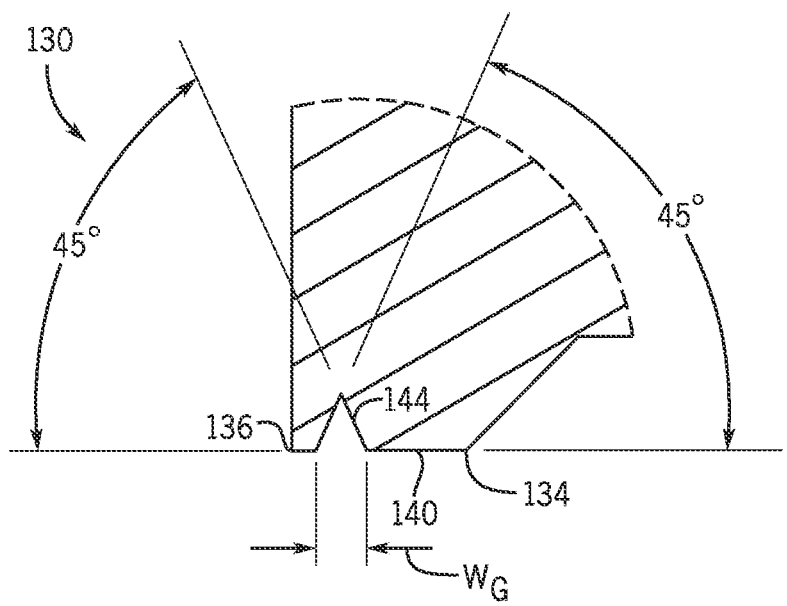
FIG. 5 is a zoomed in cross-sectional view taken at area A-A of the disc holder of FIG. 4, including a first groove geometry according to one example of the disclosed technology.
Figure 6:
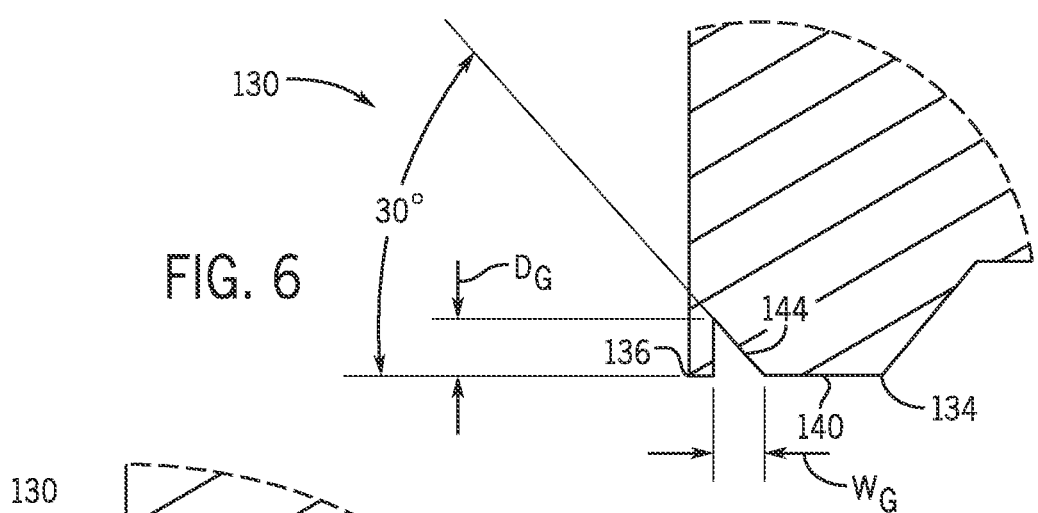
FIG. 6 is a zoomed in cross-sectional view taken at area A-A of the disc holder of FIG. 4, including a second groove geometry according to another example of the disclosed technology.
Figure 7:
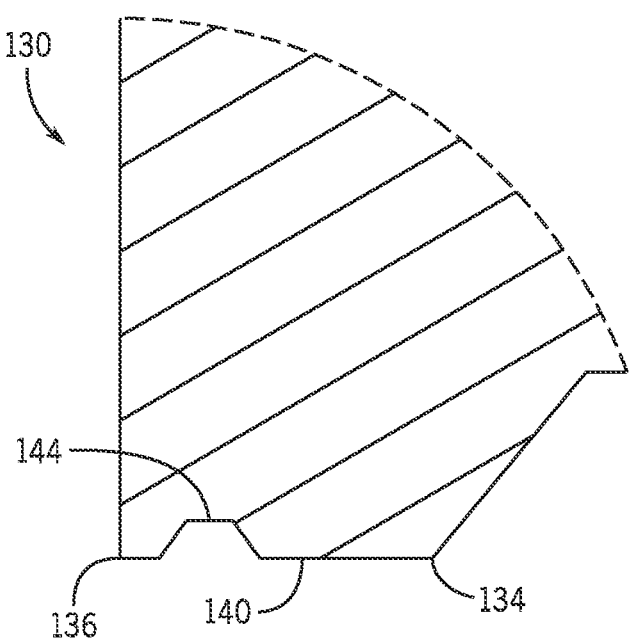
FIG. 7 is a zoomed in cross-sectional view taken at area A-A of the disc holder of FIG. 4, including a third groove geometry according to another example of the disclosed technology.

FIGS. 5-7 illustrate a zoomed in view of a portion of the seat region 138 at the area A-A of FIG. 4. Each of FIGS. 5-7 show first, second, and third exemplary profiles of the groove 144 formed in the body 132 of the disc insert 130. In particular, FIG. 5 illustrates the groove 144 having an apex that is formed by angled opposing side walls of the groove 144 (i.e., at the top of the groove 144 in FIG. 5, axially recessed away from the sealing surface 140). In some cases, including as shown, the side walls can be symmetrically arranged. For example, each of the side walls can extend at, or at about, a 45 degree angle (i.e., at 45 degrees±15 degrees, inclusive) with respect to a radial direction, with the inner side wall extending toward the apex of the groove 144 in a direction away from the inner diameter 134 and the outer side wall extending toward the apex in a direction away from the outer diameter 136. Correspondingly, the apex forms a 90 degree internal angle. In the illustrated example, the apex of the groove 144 is positioned closer to the outer diameter 136 than the inner diameter in the same plane as the width W of the seat region 138. This arrangement may be particularly beneficial in some cases, including with respect to increased localized pressure and corresponding behavior of the disc insert 130 during operation. However, other configurations are also possible.

FIG. 6 illustrates another example of the groove 144 having an apex that is formed by side walls of the groove 144, one of which extends at, or at about, a 30 degree (i.e., at 30 degrees±10 degrees, inclusive) with respect to a radial direction, extending away from the inner diameter 134 to the apex. In the illustrated example, another side wall of the groove 144 extends at a 90 degree angle with respect to the radial direction, along a side of the groove 144 that is closer to the outer diameter 136. Correspondingly, the apex forms a 60 degree internal angle. This arrangement may be also particularly beneficial in some cases, including with respect to increased localized pressure and corresponding behavior of the disc insert 130 during operation. However, other configurations are also possible. For example, some grooves can include a 30 degree side wall that extends to an apex away from an outer diameter of a disc assembly, some grooves can include a first side wall with any one of the angles discussed above (or other angles) and a second side wall with the same or a different any one of the angles discussed above (or other angles), and some grooves can include more than two side walls or more than one apex.

In each example illustrated in FIGS. 5 and 6, each of the grooves 144 define a groove width $W_G$. In some examples, the groove width $W_G$ can be less than a groove depth DG. It should be appreciated that a variety of groove widths, groove depths, groove geometries, and groove angles (e.g., between 30 degrees and 60 degrees) are possible to achieve a reduced simmering effect in a relief valve. For example, in some configurations, the groove 144 can define a trapezoidal geometry (see, for example, FIG. 7). Additionally, in some examples, the disc insert 130 may be interchangeable within a disc assembly, such as within the disc holder 106, for example, to provide customizable groove geometries and fluid guides, including the grooves 144 illustrated in each of FIGS. 5 and 6, among others.

In use, the groove 144 can also operate as a fluid guide to divert a portion of fluid flow during a relief event into the small axially-opening chamber created by the groove 144 and thereby convert an increased portion of the fluid momentum into an upward force. In particular, as a disc assembly is lifted off of a seat of a nozzle, the groove 144 can be exposed to fluid flow across the seat (e.g., a relatively minute simmering flow). A portion of this flow can be diverted into the groove 144 and the resulting upward force can provide corresponding force augmentation to reduce valve simmer as compared with a disc insert without a groove.

Additionally and favorably, the groove 144 can effectively move the average seat diameter at zero lift closer to the inner diameter 134 of the nozzle by reducing the overall effective width of the seat. A lower effective width can provide a lower effective area on the disc insert 130, and therefore, a lower effective pressure as fluid flows through the valve. As a result of lowering the effective pressure at lower lifts, the force ratio (i.e., as above, the measured force of the system fluid divided by the force at zero valve lift) increases at a steadier rate compared to a disc insert without a groove. Additionally, lowering the effective pressure at lower lifts can provide increased stability in valves with lower set pressures.

In general, a spring-operated pressure relief valve having the disc insert 130 with the groove 144 formed in the body 132 can thus provide a method of reducing simmer in the spring-operated pressure relief valve without the added cost, flow restriction, or requirement of precise alignment that are associated with a nozzle ring. As noted below, however, such a disc insert or other similar disc assembly can be advantageously used with a nozzle ring in some case (e.g., can be used in combination with a nozzle extender).

Additionally, the groove 144 of the disc insert 130 can be integrally formed in the body 132 of the disc insert 130 or otherwise integrally included in a relevant disc assembly. As a result, the simmering reducing mechanism (i.e., the groove 144) moves with the disc insert 130 during a relief event, thereby providing consistent supplemental force via the fluid momentum huddled in the chamber of the groove 144.

Figure 8:
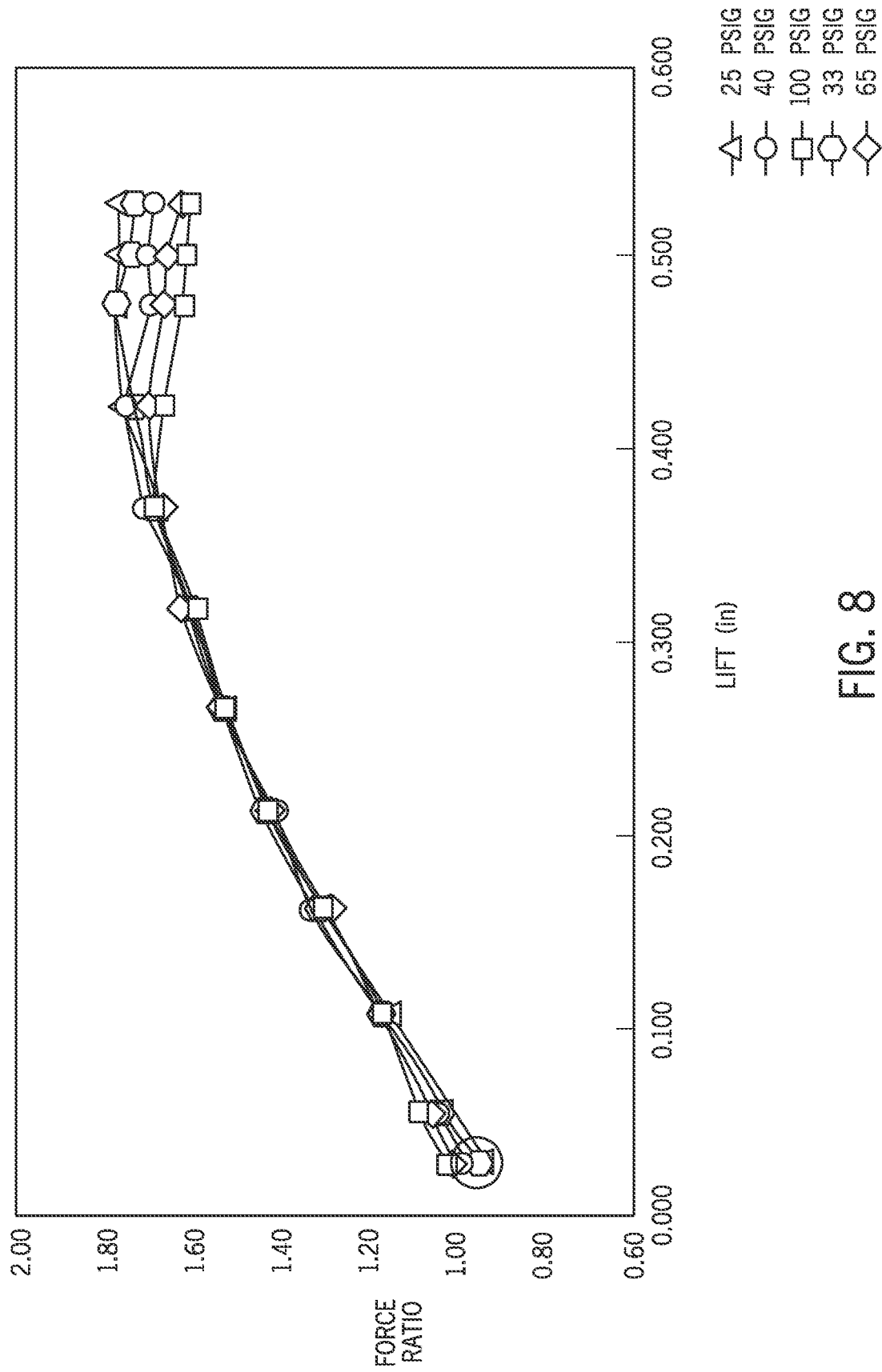
FIG. 8 is a graph illustrating a force ratio verses lift of a spring-operated pressure relief valve that includes the disc holder of FIG. 4 for gaseous nitrogen at various flowing pressures.
Figure 9:
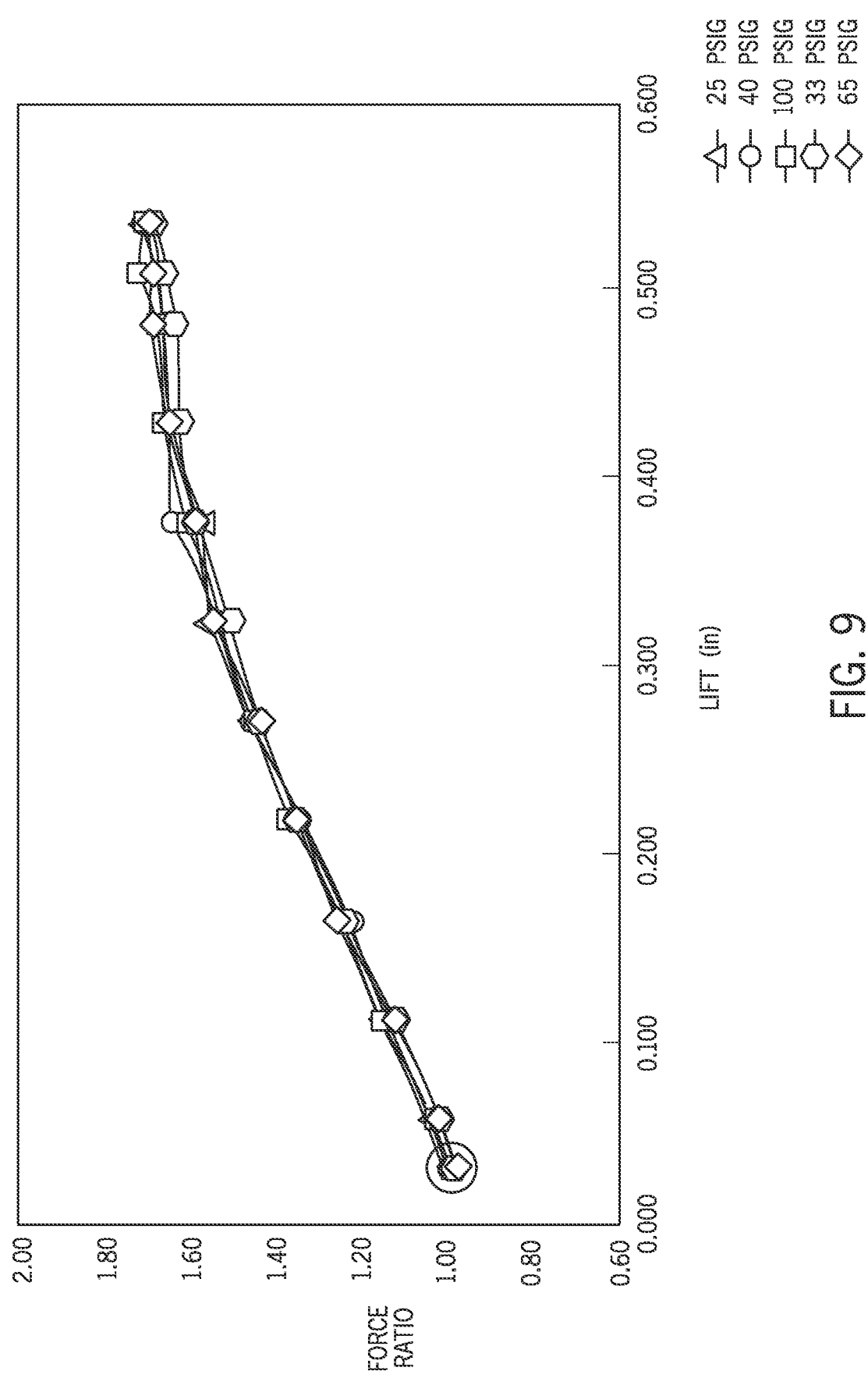
FIG. 9 is a graph illustrating a force ratio versus lift of a spring-operated pressure relief valve that includes the disc holder of FIG. 4 for liquid water at various flowing pressures.

FIGS. 8 and 9 include graphs that show data collected similarly to the graphs of FIGS. 2 and 3, respectively. However, the graphs in FIGS. 8 and 9 include exemplary data collected from a spring-operated pressure relief valve equipped with the disc insert 130 having the first groove example 144 illustrated in FIG. 5. Additionally, unlike the graphs of FIGS. 2 and 3, the graphs of FIGS. 8 and 9 do not indicate a similarly substantial drop in the force ratio below 1 at lower lifts (e.g., 0.03 inches). As also discussed above, the groove 144 achieves an increase in force ratio by increasing the upward force by changing the fluid interaction with the disc insert 130 and by reducing the effective seat width for the disc insert 130. It should be appreciated that similar graphs to those of FIGS. 8 and 9 can be produced using the disc insert 130 having the second groove example 144 illustrated in FIG. 6.

FIGS. 10 and 11 illustrate exemplary numerical comparisons of performance metrics of a spring-operated pressure relief valve having no mechanism to reduce simmer and a spring-operated pressure relief valve having a corrugated disc insert, such as the disc insert 130 of FIG. 4. In particular, FIG. 10 summarizes the percent increase in force ratio at 0.03 inch valve lift for both examples of the grooves 144 illustrated in FIGS. 5 and 6 when compared to a conventional disc insert design. The table of FIG. 11 includes a table of compared simulated overpressure and blowdown percentages. In general, as shown by FIG. 11, a grooved disc insert reduces the overpressure and the blowdown for the relevant valve to be closer to the set pressure. In particular, the negative sign indicates that the first groove example (shown in FIG. 5) had a shorter blowdown and overpressure compared to a conventional disc insert. In general, the unchanged seat width data only considers the percent increase in upward fluid force contributed by the fluid flow.

In general, both tables shown in FIGS. 10 and 11 indicate that a disc insert having a groove formed in the body of the disc insert mitigates a long simmer for both gas and liquid working fluids, especially during low pressure operation in which a simmering event is more prominently observed with conventional valves. A grooved insert can generally reduce the overpressure and allow the blowdown to be reduced, compared to a conventional valve (e.g., for which a lower spring rate is often chosen to reduce the overpressure and increase the blowdown).

FIGS. 12-16 illustrate additional disc assembly and nozzle configurations that may be used with a spring-operated pressure relief valve. Some configurations described below may be used alone or in combination with other disc assembly or nozzle configurations, including those described herein, to generally reduce simmering in a valve.

Figure 12:
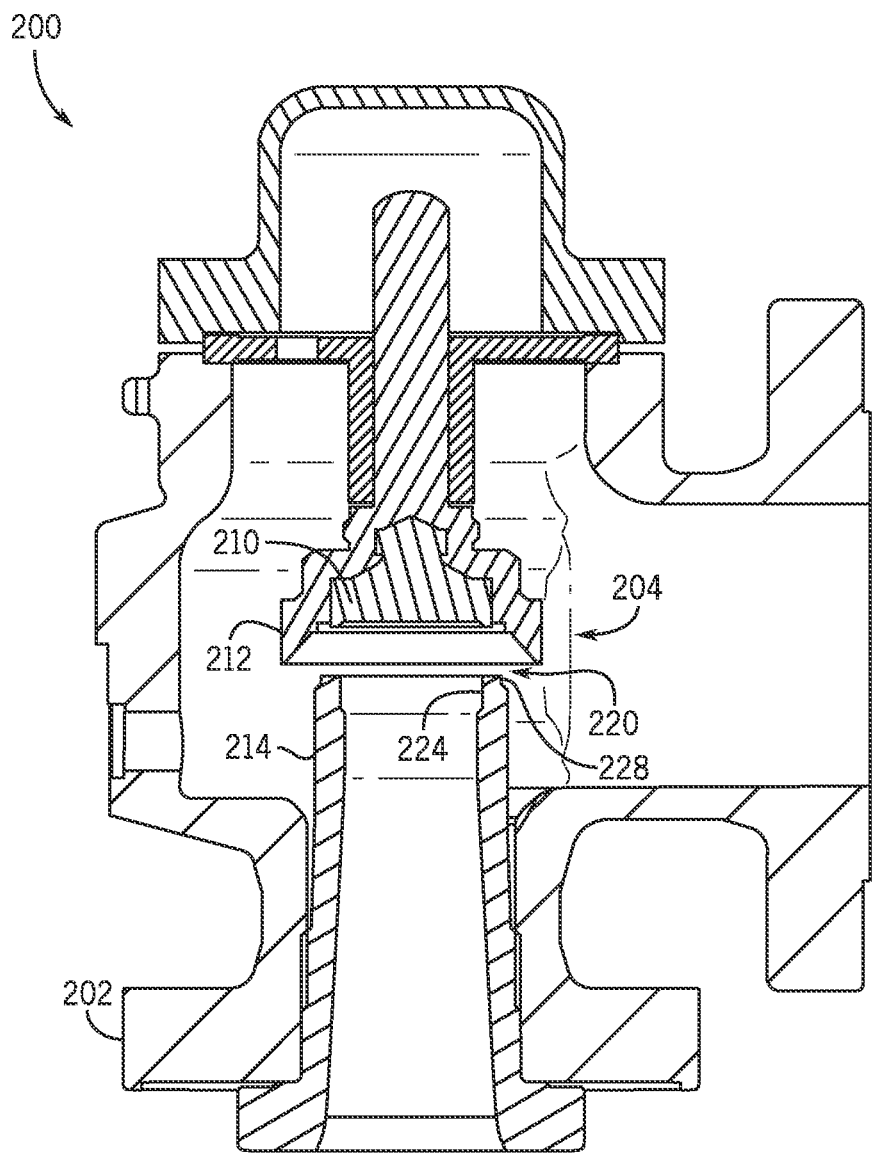
FIG. 12 is a cross-sectional view of a spring-operated pressure relief valve including a nozzle, a disc, and a disc holder according to another example of the disclosed technology.
Figure 12A:
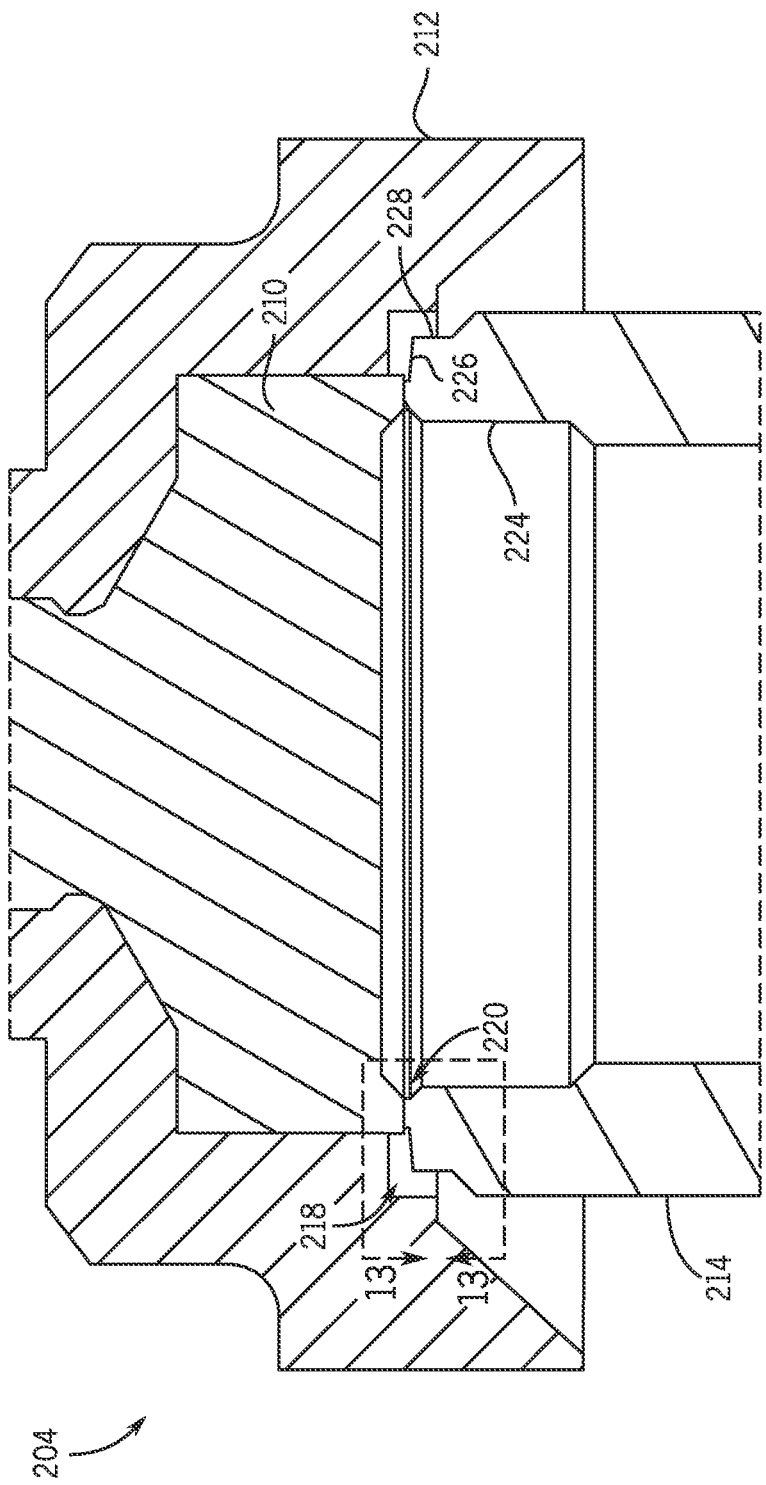
FIG. 12A is a zoomed in cross-sectional view of the disc and disc holder of FIG. 12.

With reference to FIGS. 12 and 12A, a spring-operated pressure relief valve 200 can include a valve body 202 and a simmer reduction system 204. In general, a simmer reduction system can include a variety of valve components, such as, for example, one or more of a disc, a disc insert, a disc holder, a nozzle, or a nozzle extension. In this regard, the disc insert 130 described above (or others) can be included in the valve 200 to form a portion or an entirety of a simmer reduction system. Correspondingly, discussion above relative to the disc insert 130, and the valve 100 generally, should be understood to apply to example configurations of the valve 200 as discussed below. With continued reference to FIGS. 12 and 12A, the simmer reduction system 204 includes a disc 210 (e.g., as can be formed by the disc insert 130), a disc holder 212, and a nozzle 214.

In the general, the simmer reduction system 204 can improve on reducing simmer in the spring-operated pressure relief valve 200, including in configurations without a nozzle ring. In particular, the simmer reduction system 204 can provide a fluid guide to divert a portion of fluid flow in the valve 200 into an area near a seat region 220 of the disc holder 212 (see, for example a recess 218 shown in FIG. 12A). In use, the momentum of the diverted fluid or related pressure huddling effects can then provide a supplemental opening (e.g., upward, axial) force to lift the valve. The supplemental upward force can provide a force augmentation that can help to reduce simmer so that once the disc 210 and disc holder 212 have left the valve seat, steady or increased fluid pressure will generally continue to raise the disc holder 212 rather than allow repeated cycles of up and down movement (i.e., simmering).

As shown in FIG. 12A, the recess 218 formed in the disc holder 212 can define a chamber to provide a fluid diversion area between the disc 210, the disc holder 212 and the nozzle 214. As shown, for example, the formed chamber can be adjacent the seat region 220, on a downstream side of the seat region 220 relative to the inlet of the nozzle 214. When the valve is closed, the disc 210 can contact the nozzle 214 adjacent to an inner diameter 224 of the nozzle 214.

Further, a lip 226 at an outer diameter 228 of the nozzle 214 can be disposed within the recess 218 of the disc holder 212, with the disc assembly (i.e., the disc holder 212 and the disc 210) in a closed position to seal against the nozzle 214, including as can improve fluid diversion for reduced simmering. In the illustrated example, the lip 226 defines about a 5 degree angle (i.e., 5 degrees±1.25 degrees) with respect to a radial (e.g., horizontal) plane, sloping away from the seat area 220, from the inner diameter 224 to the outer diameter 228. While other slope angles are possible, the slope of the lip 226 generally helps build additional fluid momentum and fluid force in the recess 218 during a valve event. Additionally, the proximity of the outer diameter 228 to the disc holder 212 can provide improved liquid recovery at lower lifts when compared to conventional valves.

Figure 13:
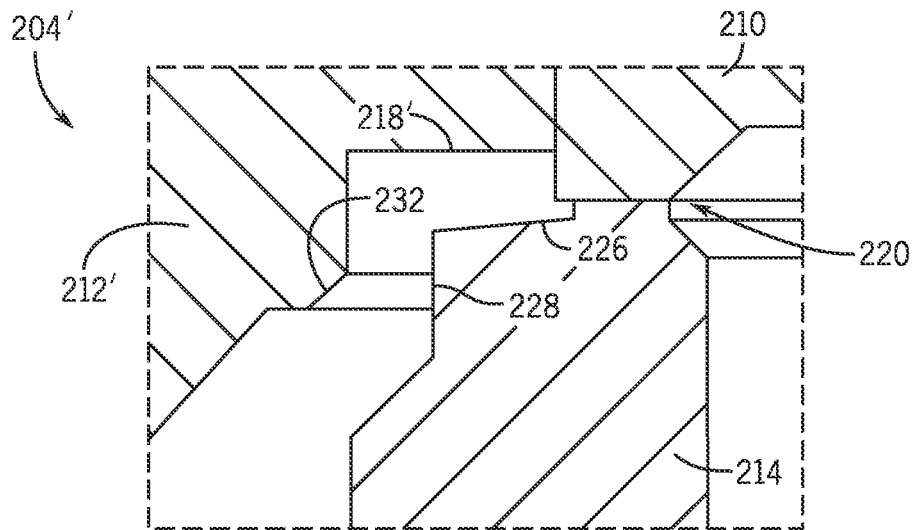
FIG. 13 is a zoomed in cross-sectional view of a disc holder with a chamfer according to another example of the disclosed technology, with an associated valve in a closed orientation.
Figure 14:
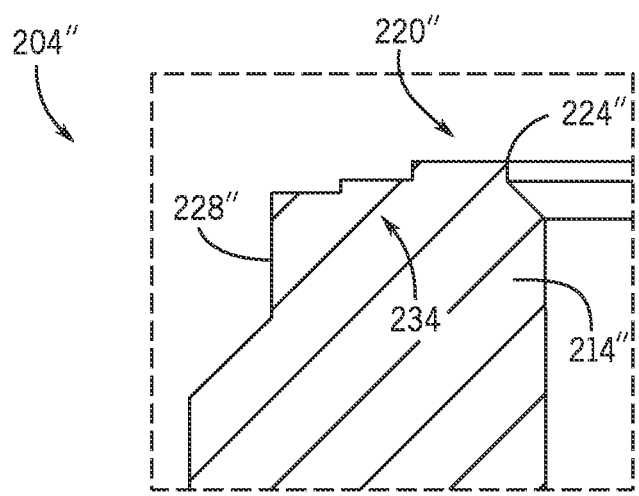
FIG. 14 is a zoomed in cross-sectional view of a nozzle with a stepped profile according to another example of the disclosed technology.

Similar to FIG. 12A, FIGS. 13 and 14 illustrate additional examples of simmer reduction systems that may be used in a valve, including the spring-operated pressure relief valve 200. As a result, like reference numbers will be used to identify similar components of the simmer reduction systems of FIGS. 12, 13, and 14.

FIG. 13 illustrates another configuration of the simmer reduction system 204, in particular as a simmer reduction system 204' that includes another example disc holder 212', along with the nozzle 214 and the disc 210 (although other nozzle and disc configurations are possible). The disc holder 212' includes a fluid guide formed as a recess 218' and an angled guide surface. The fluid guide is generally located downstream of the sealing surface of the nozzle 214 (i.e., downstream of the seat region 220) and is configured to divert a portion of fluid flow past the sealing surface of the nozzle 214' into an axial force augmentation to lift the disc holder 212' against a biasing assembly. Generally, the disc holder 212' can be used with a variety of sealing discs including, for example, the disc insert 130. Correspondingly, the axial force augmentation from the fluid guide of the disc holder 212' can in some cases supplement the axial force augmentation from the groove 144 as discussed above (i.e., in examples using the disc insert 130).

In some examples, as shown in FIG. 13, a fluid guide can include a chamfer 232 at a downstream edge of the recess 218' and aligned with an outer diameter 228' of the nozzle 214'. Similar to the simmer reduction system 204 of FIG. 12, the recess 218' can divert fluid flow and thereby increase fluid pressure against the disc holder 212' during a valve event to reduce unwanted simmering. For example, the chamfer 232 can direct additional fluid flow into the recess 218' of the disc holder 212' during a valve event, or condition flow leaving the recess 218' to add additional supplemental lift force and corresponding reduction in valve simmer.

FIG. 14 partially illustrates another configuration of the simmer reduction system 204, in particular as a simmer reduction system 204" that includes a disc holder (e.g., the disc holder 212 or 212', not shown in FIG. 14) and a nozzle 214". The nozzle 214" includes a stepped portion 234 at an outer diameter 228" of the nozzle 214". In particular, the stepped portion 234 extends between the outer diameter 228" and an inner diameter 224" of the nozzle 214" with a succession of squared shoulders, although other configurations are possible. Similar to the angled lip 226 (see FIG. 13), the stepped portion 234 can generally help direct fluid flow toward a disc holder during a valve event to help add a supplemental lift force on the disc holder and reduce valve simmer. Consistent with the general discussion above, the nozzle 214" may be used in the spring operated pressure relief valves 100, 200 (or other valves) In some examples, or in conjunction with various disc holders (e.g., the disc holder 212 or 212') or disc inserts (e.g., the insert 130). In the illustrated example, the stepped portion 234 is adjacent to a seat region 220" (e.g., similar to the lip 226 of FIG. 13), although other configurations are possible/

Figure 15:
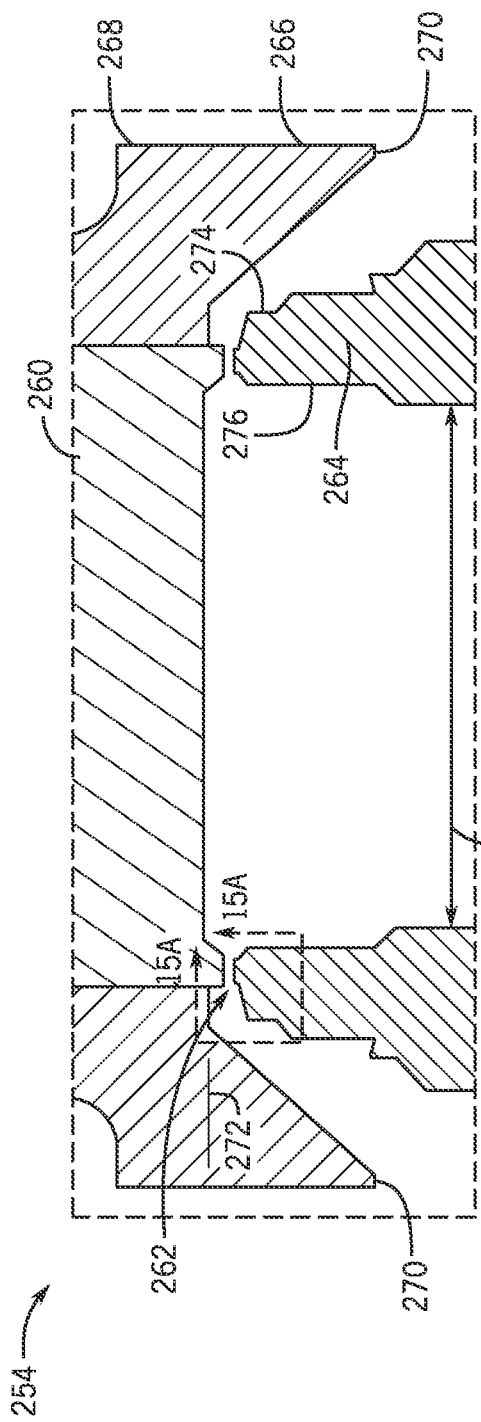
FIG. 15 is a zoomed in cross-sectional view of a disc holder and a nozzle for a spring-operated pressure relief valve, with the nozzle including a nozzle lip and the valve in an open orientation.
Figure 15A:
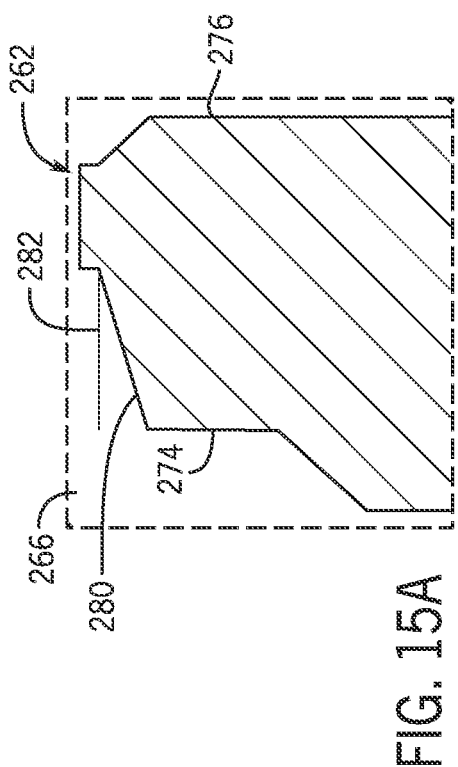
FIG. 15A is a zoomed in cross-sectional view of the nozzle lip of FIG. 15.

FIGS. 15 and 15A illustrate another example of a simmer reduction system 254 according to an example of the disclosed technology. In the illustrated example, the simmer reduction system 254 includes a disc assembly 260 and a nozzle 264. The disc assembly 260 can include a shroud 266 at an outer diameter 268 of the disc assembly 260. The shroud 266 can encircle the nozzle 264 at a seat region 262 of the valve and include a distal end 270 that can extend axially past the associated valve seat in a closed configuration. In the illustrated example, the distal end 270 is an angled distal end that can form an angle between about 40 degrees and about 55 degrees (i.e., between 40 degrees±5 degrees and 55 degrees±5 degrees) relative to a radial plane 272. In some examples, the angled distal end 270 can form about a 48 degree angle with respect to the radial plane 272 (i.e., 48 degrees±2.5 degrees).

In general, the angled distal end 270 can help direct fluid flow within the shroud 266 of the disc assembly 260 during a valve event to add a supplemental lift force on the disc assembly 260 to reduce valve simmer. In the illustrated example, the shroud 266 extends circumferentially around an outer diameter 274 of the nozzle 264 and in an axial (i.e., open-to-closed) direction past a relevant valve seat. Also in the illustrated example, the angled distal end 270 extends to be aligned radially with a location at which an inner diameter 276 of the nozzle 264 transitions to a larger bore diameter 278.

With reference to FIG. 15A in particular, the nozzle 264 can include a nozzle lip 280 that extends from proximate a valve seat of the nozzle 264 to the outer diameter 274 of the nozzle 264. Similar to the nozzle lip 226 shown in FIG. 12A, the nozzle lip 280 of FIG. 15A can be sloped axially (downstream) away from the seat region 262, from the outer diameter 274 toward the inner diameter 276. In the illustrated example, the lip 280 can define about a 15 degree angle with respect to a radial plane 282 (i.e., 15 degrees±5 degrees, inclusive). While other slope angle are possible, the slope of the lip 280 can generally help guide fluid and build additional fluid momentum during a valve event, as can cooperate with the shroud 266, for example, to reduce valve simmer.

Figure 16:
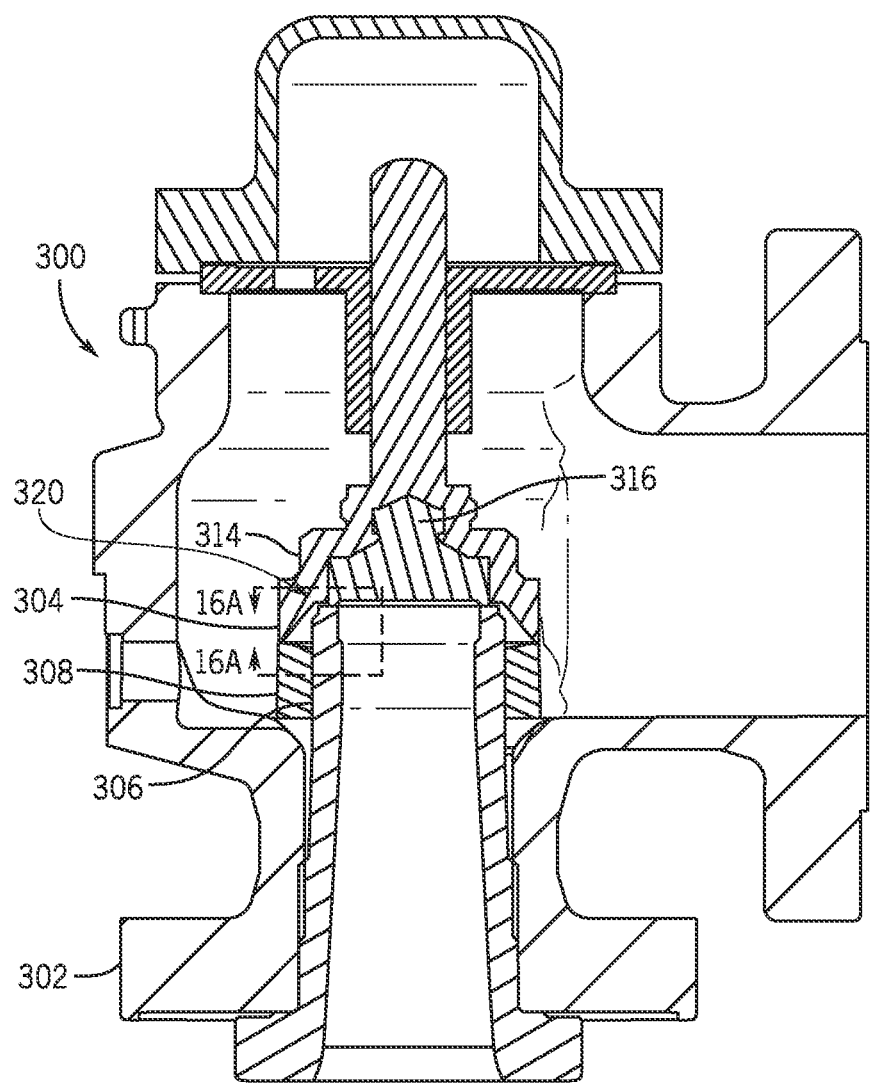
FIG. 16 is a cross-sectional view of a spring-operated pressure relief valve including a nozzle, a nozzle extension, a disc, and a disc holder according to another example of the disclosed technology, with the valve in a closed orientation.
Figure 16A:
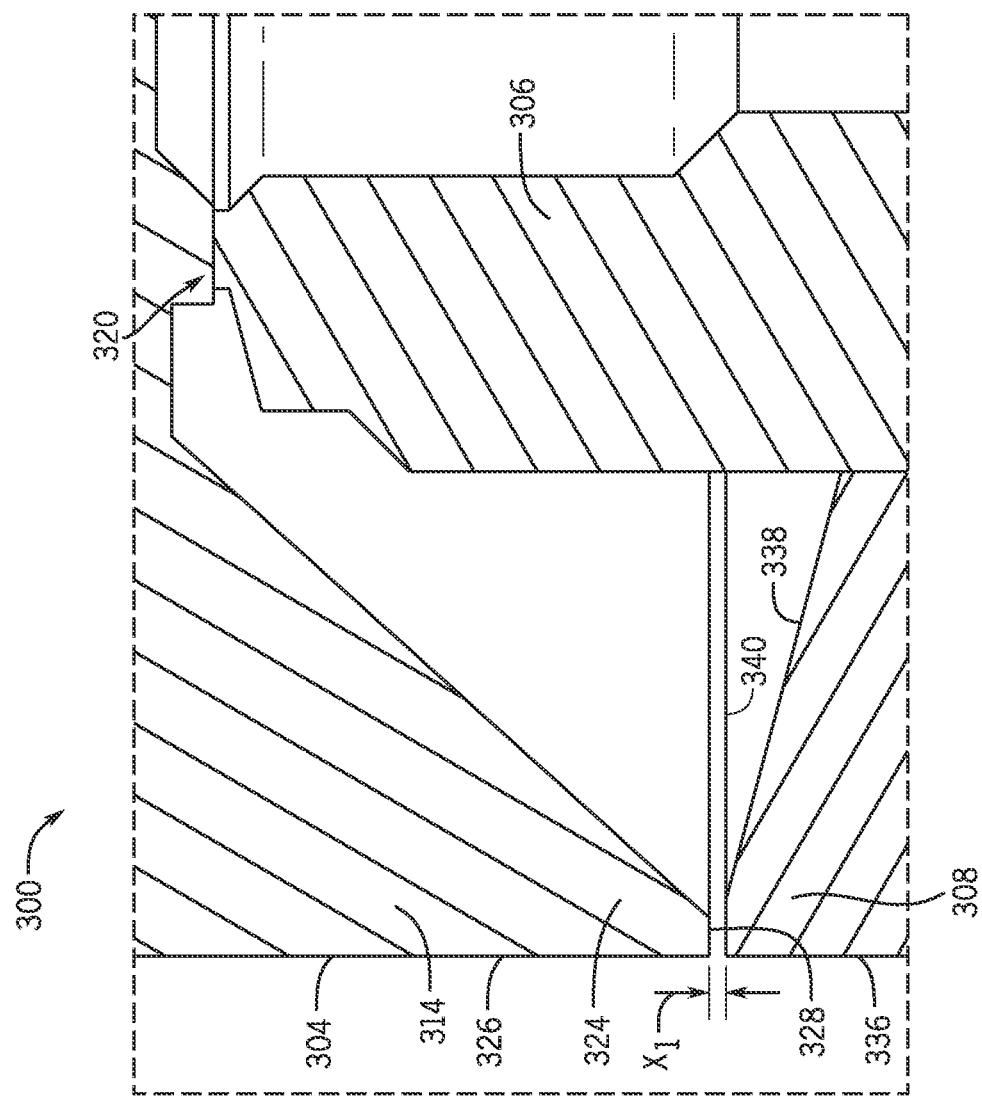
FIG. 16A is a zoomed in cross-sectional view of the nozzle extension and the disc holder of FIG. 16.

FIGS. 16 and 16A illustrate another example of a spring-operated pressure relief valve 302, configured with a simmer reduction system 300 according to an example of the disclosed technology. The spring-operated pressure relief valve 302, and the simmer reduction system 300 in particular, can include a disc assembly 304, a nozzle 306, and a nozzle extension 308, and can generally operate similarly to the valves 100, 200 discussed above. Correspondingly, discussion above relative to the disc insert 130, the simmer reduction system 204, and the valves 100, 200 generally, should be understood to apply to example configurations of the valve 302 as discussed below. With continued reference to FIGS. 16 and 16A, the disc assembly 304 can include a disc holder 314 and a disc insert 316 (e.g., as can be formed by or similar to the disc insert 130). The nozzle extension 308 can circumferentially surround the nozzle 306 adjacent to a seat region 320.

With reference to FIG. 16A in particular, the disc holder 314 can include a shroud 324 at an outer diameter 326 of the disc assembly 304. The shroud 324 can encircle the nozzle 306 adjacent to the seat region 320 and the nozzle extension 308 (e.g., with similarly angled surfaces and axial extension as the shroud 266). The shroud 324 can include a distal end 328 that can form a gap with the nozzle extension 308. In particular, the gap can be an initial flow gap $x_1$ between the disc holder 314 and the nozzle extension 308 (i.e., a width of the gap when the valve is fully closed or upon initial valve lift of off a nozzle seat). As initially installed, or thereafter, the initial flow gap $x_1$ may be set based on valve size, working fluid medium, and/or valve operating conditions, such as temperature, pressure, or location, for example. In some examples, the initial flow gap $x_1$ may be set to about 0.0128 inches (i.e., 0.0128 inches±0.0016 inches). However, smaller gaps are possible (i.e., less than about 0128 inches and greater than zero). In general, an appropriately space initial flow gap between the nozzle extension 308 and the distal end 328 of the disc holder 314 (e.g., the gap x1, as shown) can also help direct and guide fluid flow within the shroud 324 of the disc assembly 304 during a valve event, to add a supplemental lift force on the disc assembly 304 to reduce valve simmer. For example, a sufficiently small initial flow gap can contribute (e.g., further contribute) to increased huddling effects, without impeding actual relief flow, and thereby further improve valve operations as similarly discussed above.

Still referring to FIG. 16A, the nozzle extension 308 can define an outer diameter 336. In the illustrated example, the outer diameter 336 is equal to the outer diameter 326 of the disc holder 314. In general, aligning the outer diameters (326, 336) of the disc holder 314 and the nozzle extension 308 can help direct fluid flow toward the disc assembly 304 during a valve event and provide an increased huddling effect to overcome valve simmering.

In some examples, a nozzle extension can be formed separately from a nozzle and then added thereto. For example, in some configurations, the nozzle extension 308 and the nozzle 306 can include complementary threaded profiles, so that the nozzle extension 308 can be threaded onto the nozzle 306 and thereby located at a particular axial location along the nozzle 306. In some examples, a nozzle extension can be integrally formed with a nozzle. For example, in other configurations, a leading end geometry provided by the nozzle extension 308 (e.g., an angled edge as discussed below) can be integrally formed on the nozzle 306.

As also shown in the illustrated example, the nozzle extension 308 can define a leading end geometry that includes an angled edge 338 on an axial end of the nozzle extension 308. In the illustrated example, relative to a perspective moving radially away from the nozzle 306, the angled edge 338 angles axially toward the seat region 320, from the main body of the nozzle 306 toward the outer diameter 336. In particular, in some cases, the angled edge 338 can thus protrude to define about a 15 degree angle with respect to a radial plane 340 (i.e., 15 degrees±5 degrees, inclusive). In general, the combined angles of the nozzle extension 308 and the disc assembly 304 help divert fluid toward an inner diameter of the shroud 324 to provide supplemental valve lift and reduce valve simmering.

In some cases, a leading end of a nozzle extension can exhibit a change in angle to define a gap between the nozzle extension and a disc assembly. For example, as illustrated in FIG. 16A, the nozzle extension 308 includes a radially extending outer region that defines the initial flow gap $x_1$, in addition to the angled portion of the angled edge 338. In other examples, other profiles at outer regions of an upstream edge of a nozzle extension are also possible, including profiles with angled edges that extend without angle change to define an initial flow gap.

The simmer reduction systems described herein may be suitable (e.g., interchangeable) for both gas and liquid as the working fluid in a valve. However, some examples, such as the simmer reduction system 300, configured to include the disc assembly 304, the nozzle 306, and the nozzle extension 308, may be most suitable for gasses and pressure less than (or equal to) 100 bar.

A described above, simmer reduction systems described herein may include (i.e., incorporate) one or more components from the other simmer reduction systems described herein or other known simmer reduction systems (e.g., nozzle rings). That is, configurations of simmer reduction systems described herein may be used alone or in combination with other disc assembly, nozzle, and nozzle extension configurations to provide simmer reduction in a spring-operated pressure relief valve. Thus, for example, either of the simmer reduction systems 254, 300 may include features configured as or similarly to the disc insert 130, the nozzle 214, 214' the disc holder 212, 212', or other components of the pressure relief valves 100, 200. Likewise, the spring operated pressure relief valves 100, 200 can include the reduction systems 254, 300 or one or more components thereof (e.g., the nozzle 264, the nozzle 306, the shroud 266, the disc holder 314, etc.).

Thus, examples of the disclosed technology can provide an improvement over conventional spring-operated pressure relief valves and mechanisms for reducing simmering in spring-operated pressure relief valves. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein.

The invention claimed is:

1. A spring-operated relief valve comprising:
a biasing assembly;
a valve inlet fluidly connected to a system pressure;
a valve seat having a lip at an outer diameter of the valve seat, the lip defining a sloped surface that slopes downward from the valve seat in a radially outward direction;
a disc assembly that is biased toward the valve seat by the biasing assembly and includes a seat region, the disc assembly being movable axially to and from a closed orientation in which the seat region provides a seal with the valve seat against flow through the spring-operated relief valve; and
a fluid guide to divert a portion of fluid flow during a relief event of the spring-operated relief valve to convert fluid momentum into a valve-opening force to reduce valve simmer in the spring-operated relief valve;
wherein the fluid guide includes:
the lip proximate the valve seat, the lip defining an angle of about 15 degrees with respect to a radial plane; and
a recess formed in a disc holder of the disc assembly proximate the valve seat and arranged to receive a diverted fluid flow from between the disc assembly and a nozzle, and
wherein the seat region includes a groove, the groove positioned at an interface between the valve seat and the disc assembly with the disc assembly in a closed configuration, and exposed to a flow of process fluid past the valve seat with the disc assembly in an open configuration.

2. The spring-operated relief valve of claim 1, wherein the disc assembly includes a disc insert that defines a sealing surface with an inner diameter and an outer diameter, and wherein the groove is formed in the disc insert between the inner diameter and the outer diameter.

3. The spring-operated relief valve of claim 1, wherein the valve seat does not include a nozzle ring.

4. The spring-operated relief valve of claim 1, wherein the groove includes an apex formed by side walls of the groove that extend at about a 45 degree angle with respect to a radial direction.

5. The spring-operated relief valve of claim 1, wherein the groove includes an apex formed by at least one side wall of the groove that extends at about a 30 degree angle with respect to a radial direction.

6. The spring-operated relief valve of claim 1, wherein the groove is one of a plurality of grooves formed on the disc assembly that are exposed to process fluid when the disc assembly is in an open position.

7. The spring-operated relief valve of claim 1, wherein the groove is configured to one or more of:
define a chamber configured to provide a valve-opening force augmentation to reduce valve simmering during a valve relief event; or
divert fluid momentum to provide an increased valve-opening force on the disc assembly during a valve relief event.

8. A disc assembly for a relief valve, the disc assembly comprising:
a disc holder; and
a disc insert, the disc insert comprising:
a body configured to move in an axial direction to seal a relief valve;
a seat region on the body, the seat region being configured to seal against a valve seat of the relief valve and defining a seat-region width that extends between an inner diameter and an outer diameter defined by the body; and
a chamber formed by the disc holder radially outward from the seat, the chamber defining a chamber width and being exposed to receive a diverted flow of process fluid when the relief valve is in an open configuration,
wherein the chamber is formed by an angled guide surface of the disc holder, the angled guide surface defining first and second sloped surfaces that slope downward in a radially outward direction.

9. The disc assembly of claim 8, wherein the chamber width is less than the seat-region width.

10. The disc assembly of claim 8, wherein the chamber is defined by a continuous annular groove.

11. The disc assembly of claim 8, wherein the first sloped surface defines a length that is shorter than the second sloped surface, and the second sloped surface terminates at a position axially below the valve seat.

12. The disc assembly of claim 8, wherein the chamber is defined by a stepped groove in the disc holder.

13. The disc assembly of claim 8, wherein the disc holder is configured to interchangeably receive the disc insert.

14. A simmer reduction system for a spring-operated pressure relief valve, the simmer reduction system comprising:
a nozzle including a stepped portion that steps downward in a radially outward direction to an outer diameter of the nozzle and a sloped portion that slopes downward in a radially inward direction to an inner diameter of the nozzle;
a disc assembly adapted to move in an axial direction to seal against the nozzle; and
a fluid guide on one or more of the nozzle or the disc assembly, the fluid guide being adapted to divert a portion of fluid flow past the nozzle during a relief event of the spring-operated pressure relief valve away from the nozzle to convert fluid momentum of the fluid flow into an axial force to move the disc assembly away from the nozzle,
wherein neither the fluid guide nor the nozzle include a nozzle ring.

15. The simmer reduction system of claim 14, wherein the fluid guide is an axially-opening recess formed in a disc holder of the disc assembly and adapted to divert fluid flowing between the disc assembly and the nozzle to provide a lifting force on the disc assembly
wherein, with the disc assembly in a closed position to seal against the nozzle, an angled lip of the nozzle is located within the axially-opening recess.

16. The simmer reduction system of claim 14, wherein the fluid guide includes a shroud of the disc assembly, having a distal end that surrounds the nozzle adjacent to a seat region of the spring-operated pressure relief valve that is defined by the nozzle and the disc assembly.

17. The simmer reduction system of claim 16, wherein the fluid guide includes a nozzle extension;
wherein an initial flow gap is defined between the nozzle extension and the distal end of the shroud.

18. A disc assembly for a relief valve, the disc assembly comprising:
a disc holder; and
a disc insert, the disc insert comprising:
a body configured to move in an axial direction to seal a relief valve;
a seat region on the body, the seat region being configured to seal against a valve seat of the relief valve and defining a seat-region width that extends between an inner diameter and an outer diameter defined by the body; and a chamber formed by the disc holder radially outward from the seat, the chamber defining a chamber width and being exposed to receive a diverted flow of process fluid when the relief valve is in an open configuration, wherein the chamber is formed by a stepped groove and an angled guide surface of the disc holder that is sloped downward in a radially outward direction.

19. The disc assembly of claim 18, wherein the seat region on the body of the disc insert extends into the chamber.

20. The disc assembly of claim 18, wherein a nozzle of the relief valve is disposed within the chamber when the disc holder is in a closed position.

* * * * *